(12) United States Patent
Renisch et al.

(10) Patent No.: US 11,935,245 B2
(45) Date of Patent: Mar. 19, 2024

(54) SIMULTANEOUS PARTIAL VOLUME CORECTION AND SEGMENTATION REFINEMENT

(71) Applicant: KONINKLIJKE PHILIPS N.V., Eindhoven (NL)

(72) Inventors: Steffen Renisch, Hamburg (DE); Christian Buerger, Hamburg (DE)

(73) Assignee: Koninklijke Philips N.V., Eindhoven (NL)

(*) Notice: Subject to any disclaimer, the term of this patent is extended or adjusted under 35 U.S.C. 154(b) by 533 days.

(21) Appl. No.: 17/282,008

(22) PCT Filed: Sep. 27, 2019

(86) PCT No.: PCT/EP2019/076296
§ 371 (c)(1),
(2) Date: Apr. 1, 2021

(87) PCT Pub. No.: WO2020/070024
PCT Pub. Date: Apr. 9, 2020

(65) Prior Publication Data
US 2021/0350544 A1 Nov. 11, 2021

(30) Foreign Application Priority Data

Oct. 2, 2018 (EP) ..................................... 18198106

(51) Int. Cl.
*G06T 11/00* (2006.01)
*G06T 7/00* (2017.01)
*G06T 7/149* (2017.01)

(52) U.S. Cl.
CPC ............ *G06T 7/149* (2017.01); *G06T 7/0012* (2013.01); *G06T 2207/10088* (2013.01);
(Continued)

(58) Field of Classification Search
CPC .................. G06T 7/149; G06T 7/0012; G06T 2207/10088; G06T 2207/30008;
(Continued)

(56) References Cited

U.S. PATENT DOCUMENTS 6,246,784 B1* 6/2001 Summers .............. G06T 7/0012
382/128
8,588,498 B2 11/2013 Novak et al.
(Continued)

OTHER PUBLICATIONS

Ecabert et al "Automatic Model Based Segmentation of the Heart in CT Images" IEEE Transactions on Med. Imaging, vol. 27, No. 9 p. 1189-1201, Sep. 2008.
(Continued)

*Primary Examiner* — Samir A Ahmed

(57) ABSTRACT

The invention provides for a medical apparatus (100, 400, 600) comprising a memory (110) for storing machine executable instructions (120) and a processor (104) for controlling the medical apparatus. Execution of the machine executable instructions causes the processor to: receive (200) a medical image (122) descriptive of a three-dimensional anatomy of a subject (418); and provide (202) an image segmentation (124) by segmenting the medical image into multiple tissue regions (300, 302) using a model-based segmentation. The model-based segmentation assigns a tissue type to each of the multiple regions. The model-based segmentation has a surface mesh (304). The segmentation is corrected by using the tissue type assigned to each of the multiple regions to correct for partial volume effects at boundaries formed by the surface mesh between at least some of the multiple tissue regions.

15 Claims, 10 Drawing Sheets

(52) U.S. Cl.
CPC ............... *G06T 2207/30008* (2013.01); *G06T 2207/30016* (2013.01); *G06T 2207/30024* (2013.01)

(58) Field of Classification Search
CPC . G06T 2207/30016; G06T 2207/30024; G06T 2210/41; G06T 11/00; G06T 7/12
See application file for complete search history.

(56) References Cited

U.S. PATENT DOCUMENTS

| | | | |
|---|---|---|---|
| 2002/0015517 A1 | 2/2002 | Hwang et al. | |
| 2009/0273610 A1 | 11/2009 | Busch et al. | |
| 2010/0261993 A1 | 10/2010 | Van Der Kouwe et al. | |
| 2013/0083987 A1* | 4/2013 | Novak | G06T 7/174 382/131 |
| 2013/0163836 A1* | 6/2013 | Pau | G06T 17/00 382/128 |
| 2016/0054416 A1 | 2/2016 | Stehning et al. | |
| 2017/0131375 A1 | 5/2017 | Schadewaldt et al. | |

OTHER PUBLICATIONS

Schur et al "A Deformable Model for the Reconstruction of the Neonatal Cortex" 2017 IEEE 14th International Symposium on Biomedical Imaging, Apr. 1, 2017 p. 800-803.
Hilmi Rifai et al "Segmentation of the Skull" Medical Image Analysis vol. 4, No. 3, Sep. 1, 2000, p. 219-233.
Blake C. Lucas "Spring Level Sets: A Deformable Model Represenation to Provide Interoprability Between Meshes and Level Sets" IEEE Transactions on Visualization and Computer Graphics, vol. 19, No. 9, May 1, 2013 p. 852-865.
Montagnat et al "A Review of Deformable Surfaces: Topology, Geometry and Deformation" Image and Vision Computing vol. 19, No. 14, Dec. 1, 2001 p. 1023-1040.
Teodor Stanesu et al "3T MR Based Treatment Planning for Radiotheraphy of Brain Lesions" Radiology and Oncology vol. 40, No. 2, Jan. 1, 2006 p. 125-132.
International Search Report and Written Opinion from PCT/EP2019/076296 dated Oct. 2, 2018.
Meltzer, Carolyn Cidis, et al. "Correction of PET data for partial volume effects in human cerebral cortex by MR imaging." Journal of computer assisted tomography 14.4 (1990): 561-570.
Hwang et al "Subvoxel Processing: A Method for Reducing Partial Volume Blurring with Application to in Vivo MR Images to Trabecular Bone" Magnetic Resonance in Med. vol. 47 p. 948-957 (2002).

* cited by examiner

SIMULTANEOUS PARTIAL VOLUME CORECTION AND SEGMENTATION REFINEMENT

CROSS REFERENCE TO RELATED APPLICATIONS

This application is a U.S. national phase application of International Application No. PCT/EP2019/076296 filed on Sep. 27, 2019, which claims the benefit of EP Application Serial No. 18198106.9 filed on Oct. 2, 2018 and is incorporated herein by reference.

FIELD OF THE INVENTION

The invention relates to medical imaging, in particular to the segmentation of medical imaging.

BACKGROUND OF THE INVENTION

In medical imaging modalities such as Magnetic Resonance Imaging (MRI), Computed Tomography (CT), or Positron Emission Tomography (PET) model-based segmentation may be useful for classifying different anatomical regions. A difficulty in using these segmentation techniques is that the images are divided into discrete volumes or voxels. In the boundaries between different anatomical regions a single voxel may contain tissue from two or more anatomical regions. The image contrast or value for boundary voxels is therefore due to combination of different tissue types from the region represented by the voxel. This is referred to as partial volume effects. This may lead to inaccurate segmentation of the medical image.

United States patent application US 2017/0131375A1 discloses a method for estimating a pseudo CT Hounsfield Unit value for a volume element within a subject from a plurality of magnetic resonance images having different contrasts. The method comprising the steps of: determination of a relative prevalence of a first tissue class and second tissue class within the volume element from a first magnetic resonance image and second magnetic resonance image respectively. Then a relative prevalence of a third tissue class is determined within the volume element based on subtraction of a relative prevalence of the first and/or second tissue class from a total tissue prevalence. A reference Hounsfield Unit value is provided for the first, second and third tissue class. Finally, a pseudo Hounsfield value is estimated for the volume element by determining a weighted sum of the first, second and third reference Hounsfield unit value, with weight factors which are based on the determined relative prevalence of the first, second and third tissue class.

The journal article O. Ecabert et al., "Automatic Model-Based Segmentation of the Heart in CT Images," in IEEE Transactions on Medical Imaging, vol. 27, no. 9, pp. 1189-1201, Sep. 2008. doi: 10.1109/TMI.2008.918330 discloses the segmentation of a heart in CT images using a shape constrained deformable model. The segmentation is formulated as the optimization of an energy balance with an external energy term that represents an attraction to a boundary in the CT image and an internal energy term which represents a shape constraint.

SUMMARY OF THE INVENTION

The invention provides for a medical apparatus, a method, and a computer program product in the independent claims. Embodiments are given in the dependent claims.

Embodiments may provide for an improved method of segmentation a medical image using a model-based segmentation. The model-based segmentation defines a model of the anatomy using a surface mesh. This surface mesh is deformed or fitted to the medical image. The location of the surface mesh after segmentation is then used to divide the medical image into different regions. The segmentation can be improved by first making an assumption about the intensity value in regions on either side of the boundaries defined by the surface mesh. Voxels on one side of the surface mesh can be assumed to have a first intensity value range and voxels on the other side of the surface mesh can be assumed to have a second intensity value range. Voxels in the boundary between the two will exhibit the partial volume effect because they contain both types of tissue. The position of surface mesh can then be adjusted so that the contribution to the voxel intensity is consistent with the partial volume of the two tissue types as defined by the position of the surface mesh.

In one aspect the invention provides for a medical apparatus that comprises a memory for storing machine-executable instructions and a processor that is configured for controlling the medical apparatus. Execution of the machine-executable instructions causes the processor to receive a medical image descriptive of a three-dimensional anatomy of a subject. Execution of the machine-executable instructions further causes the processor to provide an image segmentation by segmenting the medical image into multiple tissue regions using a model-based segmentation. The model-based segmentation assigns a tissue type to each of the multiple regions. The model-based segmentation has a surface mesh. The segmentation is corrected by using the tissue type assigned to each of the multiple regions to correct for partial volume effects at boundaries formed by the surface mesh by at least some of the multiple tissue regions.

A partial volume effect as used herein encompasses a measurement such as an intensity or other value that is assigned to a voxel that is due to more than one type of tissue within the region represented by the voxel. For example, at a boundary between bone tissue and other tissue of a subject the bone may be in contact with materials such as fat, connective, or muscle tissue. Within the region of a voxel the voxel may be partially filled with bone tissue as well as one or more of the above-named tissue types. When imaging using a radiological imaging modality such as positron emission tomography, MRI, or computer tomography, the intensity or value assigned to a particular voxel may be considered to be relatively uniform within regions of that particular tissue type. At boundaries between two or more different tissue types there may be voxels that are partially filled with bone and some other tissue. This may cause the voxel to have a value or intensity that is intermediate to the two tissue types to which it is adjacent.

This embodiment may be beneficial because the position of the surface mesh may be adjusted such that the surface mesh divides the voxels appropriately so that the intensity or other value assigned to a voxel is consistent with the fractions of different tissue types within its volume.

In another embodiment the surface mesh is formed from faces. A face as used herein is a surface segment. The face may for example be formed from a planar surface, but it is not limited to this. In other examples, the faces may be formed from curved surfaces and these curved surfaces are joined together to form the surface mesh. For a planar face, such as a triangular face, a normal direction is defined for all portions of the face.

However, one may use other surface representations; e.g. one could used curved "cylinder segments" as elementary faces of a mesh. These mathematically may have a local normal vector, but because the surface is curved there is not a single vector that is normal to the entire surface, yet one could define an "outward pointing direction," e.g. as the line connecting a centerline, center point, or centroid of the entire structure defined by the surface mesh with the center point of a particular face. Alternatively, a local normal vector may be chosen as the outward facing vector for a curved surface. For curved surfaces, this may work as well as the normal vector for planar surfaces.

The surface mesh may therefore be formed by a number of faces or surfaces. Each of the faces has an outward facing vector as described above. In some cases, where the face is a planer surface the outward facing vector may be a normal vector that is normal to the planar surface. When considering a planar face references to the outward facing vector may be replaced with a normal vector.

The correction of the segmentation is performed by adjusting the position of each of the faces in the direction of the outward facing vector to correct the partial volume effect at the boundaries between at least some of the multiple tissue regions. In this embodiment the position of each of the faces is adjusted along its outward facing vector such that the intensity or value within that voxel is consistent with the fractions of different tissue types within that voxel.

For example, if the segmentation cuts through a voxel and the voxel is partially occupied by bone and partially occupied by muscle tissue then the position of the face is adjusted along the direction of the outward facing vector such that the intensity could be derived from a voxel filled with that much bone and that much muscle tissue. If the face is planar then it is mathematically convenient to us a normal vector as the outward facing vector.

In another embodiment the medical image comprises voxels.

In another embodiment the model-based segmentation assigns a voxel intensity range to each tissue type.

In another embodiment boundary voxels exhibiting the partial volume effect have a volume intensity intermediate to the voxel intensity range on either side of the surface mesh. In other words, those voxels with which the mesh passes through have a voxel intensity that is in between the voxel intensities assigned to the tissue types on either side of the boundary created by the surface mesh.

In another embodiment the adjusting of the position of each of the faces in the direction of the outward facing vector is performed by adjusting the position of each of the faces such that the voxel intensity of the boundary voxels is consistent with the contribution to the voxel intensity from tissue types on both sides of the surface mesh. The surface mesh is the segmentation and essentially divides the medical image into regions of different tissue types. By repositioning the faces which make up the surface mesh the contribution to the voxel intensity from each of these two tissue types can be adjusted.

In another embodiment the correction of the segmentation is performed after segmentation by the model-based segmentation. In this embodiment a correction of the segmentation is applied in an iterative fashion. First the model-based segmentation is performed and then later the position of the faces is adjusted along their outward facing vector to arrive at the correct voxel intensity for each of the voxels in the boundary region. This may provide an effective means of implementing such a correction. For example, stock or standard model-based segmentation routines can be applied and then later the correction of the segmentation can be performed.

In another embodiment the model-based segmentation is a shape-constrained deformable model that is confined for segmenting the medical image by bouncing an external energy term which defines an attraction to boundaries in the magnetic resonance image with an eternal energy term which defines the shape constraint of the shape-constrained deformable model. The correction of the segmentation is incorporated into the external energy term. This embodiment may be beneficial because it may aid to formulate a more effective model-based segmentation. A weighting term could for example be provided to adjust how much the correction of the segmentation affects the external energy term.

In another embodiment, the medical image is a magnetic resonance image.

In another embodiment the surface mesh is a triangulated surface mesh. The surface mesh is formed from triangles. This embodiment may be beneficial because it may be mathematically convenient to adjust the individual triangular positions.

In another embodiment the surface mesh is a polygon mesh. In this embodiment the faces of the surface mesh may take the form of any polygon.

In another embodiment the model-based segmentation comprises a brain model. This method of segmentation correction may be particularly effective when segmenting the brain. The brain contains regions of varying intensity particularly when studying magnetic resonance images.

In another embodiment execution of the machine-executable instructions further causes the processor to reconstruct a pseudo radiographic image using the image segmentation and the tissue type assigned to each of the multiple regions. In this embodiment a pseudo radiographic image may be interpreted as either a pseudo computer tomography image or a pseudo X-ray image. It may also refer to a magnetic resonance-based digitally reconstructed radiograph. Because the medical image has been divided into two different tissue types a knowledge of the properties of these different tissue types such as how well they absorb X-ray or other ionizing radiation can be used to simulate an X-ray image or to simulate a CT or computer tomography image. The improved model-based segmentation may therefore be used to provide for more accurate pseudo radiographic images.

It should be noted that as the pseudo radiographic image is constructed from the segmentation of the medical image they are automatically registered to one another.

In another embodiment the model-based segmentation comprises a cortical bone model. Execution of the machine-executable instructions further causes the processor to correct the pseudo radiographic image using the cortical bone model. For example, the cortical bone model can be incorporated into the model-based segmentation so that when the medical image is segmented the position of the various layers of the cortical bone are known. This may be useful for making a more accurate pseudo radiographic image. The above also applies to other types of bone tissue.

In another embodiment, the cortical bone model corrects the pseudo radiographic image by segmenting the cortical bone into layers. cortical bone or compact bone can be dense. Providing the model with a cortical bone layers can make the pseudo radiographic image much more realistic.

In another embodiment, the cortical bone model is configured for segmenting cortical bone into cortical bone layers. Execution of the machine executable instructions further causes the processor to correct the pseudo radiographic image using the multiple cortical bone layers. Cortical bone or compact bone can be dense. Providing the model with a cortical bone layers can make the pseudo radiographic image much more realistic.

In another embodiment execution of the machine-executable instructions further causes the processor to reconstruct an electron density map using the pseudo radiographic image. For example, many systems take a CT or computer tomography image as input and use this with a calibration curve to provide an electron density which may be used for radiotherapy planning. The generation of the electron density map from the pseudo radiographic image may therefore be useful because it may eliminate the need to have a CT image performed for planning a radiotherapy treatment. For example, a magnetic resonance imaging system could be used for acquiring the medical image and the entire planning process could be performed using the magnetic resonance images.

Execution of the machine-executable instructions further causes the processor to receive radiation therapy planning data. The radiation therapy planning data may for example indicate regions or organs of a subject which are to be irradiated as well as how much radiation is desired to be deposited in those regions. The radiation therapy planning data may also include the identification of critical or sensitive organs which are to be avoided if possible during the radiation therapy. Execution of the machine-executable instructions further cause the processor to calculate radiotherapy system control commands configured for controlling a radiotherapy system using the electron density map and the radiation therapy planning data. The radiotherapy system control commands are data or commands which may be used to directly control a particular radiotherapy system. The radiation therapy planning data may for example be received from a workstation that is displaying on a user interface the combined medical image and the pseudo radiographic image.

In another embodiment the pseudo radiographic image has a predefined resolution. The medical apparatus further comprises a radiotherapy system. The medical apparatus further comprises a radiographic imaging system. Execution of the machine-executable instructions further causes the processor to forward-simulate partial volume effects in the pseudo radiographic image. In the forward simulation process the segmentation is used to predict partial volume effects in the pseudo radiographic image. This may be beneficial because the pseudo radiographic image then appears as a more realistic radiographic image. This may make it easier for people and/or machines to compare pseudo radiographic images with measured radiographic images.

Execution of the machine-executable instructions further causes the processor to control the radiographic imaging system to acquire an acquired radiographic image of a subject. The acquired radiographic image has a predefined resolution. This may be beneficial because both the acquired radiographic image and the pseudo radiographic image both have the same predefined resolution as well as the pseudo radiographic image having simulated partial volume effects. This may enable direct comparison between the two radiographic images. Execution of the machine-executable instructions further causes the processor to align the subject in the radiotherapy system by registering the acquired radiographic image and the pseudo radiographic image. By comparing the acquired radiographic image and the pseudo radiographic image the radiotherapy system is able to determine the position of the subject and register the position of the subject to either the radiotherapy system and/or the radiation therapy planning data.

In another embodiment the radiographic imaging system is an X-ray or fluoroscope system.

In another embodiment the radiographic imaging system is a CT or a computer tomography system.

In another embodiment the medical image is a positron emission tomography image.

In another embodiment the medical image is a magnetic resonance image.

In another embodiment the medical image is a CT or a computer tomography image.

In another embodiment the medical image is a magnetic resonance image. The medical apparatus further comprises a magnetic resonance imaging system. The memory further contains pulse sequence commands configured for controlling the magnetic resonance imaging system to acquire magnetic resonance imaging data. Execution of the machine-executable instructions further causes the processor to control the magnetic resonance imaging system with the pulse sequence commands to acquire the magnetic resonance imaging data. Execution of the machine-executable instructions further causes the processor to reconstruct the magnetic resonance image using the magnetic resonance imaging data.

In another aspect the invention provides for a medical imaging method. The method comprises receiving a medical image descriptive of a three-dimensional anatomy of a subject. The method further comprises providing an image segmentation by segmenting the medical image into multiple tissue regions using a model-based segmentation. The model-based segmentation assigns a tissue type to each of the multiple regions. The model-based segmentation has a surface mesh. The segmentation is corrected by using the tissue type assigned to each of the multiple regions to correct for partial volume effects at boundaries formed by the surface mesh between at least some of the multiple tissue regions. The advantages of this embodiment have been previously discussed.

In another aspect the invention provides for a computer program product comprising machine-executable instructions for execution by a processor controlling a medical imaging system. Execution of the machine-executable instructions causes the processor to receive a medical image. The receiving of the medical image may be performed in different ways. In some instances, receiving the medical image comprises retrieving it from a memory or other data storage medium. In other examples the receiving of the medical image may be controlling of the medical imaging apparatus such as a magnetic resonance imaging system and controlling it to acquire and then reconstruct a magnetic resonance image.

Execution of the machine-executable instructions further cause the processor to provide an image segmentation by segmenting the medical image into multiple tissue regions using a model-based segmentation. The model-based segmentation assigns a tissue type to each of the multiple regions. The model-based segmentation has a surface mesh. The segmentation is corrected by using the tissue type assigned to each of the multiple regions to correct for partial volume effects at boundaries formed by the surface mesh between at least some of the multiple tissue regions. The advantages of this embodiment have been previously discussed.

In another embodiment the medical image is a magnetic resonance imaging image. Execution of the machine-executable instructions further cause the processor to reconstruct a pseudo radiographic image using the image segmentation and the tissue type assigned to each of the multiple regions. Execution of the machine-executable instructions further causes the processor to construct an combined image by combining the pseudo radiographic image on the magnetic resonance image. For example, they can be rendered next to each other or one image could be superimposed over the other. This may have the benefit of illustrating both soft tissues from the magnetic resonance image as well as the location of bony tissues.

In another embodiment execution of the machine-executable instructions further causes the processor to render the combined image on a display. Execution of the machine-executable instructions further causes the processor to receive radiation therapy planning data from the user interface. For example, the combined image may be displayed on the user interface of a workstation which is used for radiation therapy planning. The radiation therapy planning data may for example be manually entered by a doctor or other healthcare professional and may be used to identify regions which are desired to be irradiated as well as the amounts and also indicate regions which are desired not to be irradiated because they are critical or sensitive areas of the anatomy.

It is understood that one or more of the aforementioned embodiments of the invention may be combined as long as the combined embodiments are not mutually exclusive.

As will be appreciated by one skilled in the art, aspects of the present invention may be embodied as an apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon.

Any combination of one or more computer readable medium(s) may be utilized. The computer readable medium may be a computer readable signal medium or a computer readable storage medium. A 'computer-readable storage medium' as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer readable medium. In some embodiments, a computer-readable storage medium may also be able to store data which is able to be accessed by the processor of the computing device. Examples of computer-readable storage media include, but are not limited to: a floppy disk, a magnetic hard disk drive, a solid state hard disk, flash memory, a USB thumb drive, Random Access Memory (RAM), Read Only Memory (ROM), an optical disk, a magneto-optical disk, and the register file of the processor. Examples of optical disks include Compact Disks (CD) and Digital Versatile Disks (DVD), for example CD-ROM, CD-RW, CD-R, DVD-ROM, DVD-RW, or DVD-R disks. The term computer readable-storage medium also refers to various types of recording media capable of being accessed by the computer device via a network or communication link. For example, a data may be retrieved over a modem, over the internet, or over a local area network. Computer executable code embodied on a computer readable medium may be transmitted using any appropriate medium, including but not limited to wireless, wire line, optical fiber cable, RF, etc., or any suitable combination of the foregoing.

A computer readable signal medium may include a propagated data signal with computer executable code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

'Computer memory' or 'memory' is an example of a computer-readable storage medium. Computer memory is any memory which is directly accessible to a processor. 'Computer storage' or 'storage' is a further example of a computer-readable storage medium. Computer storage is any non-volatile computer-readable storage medium. In some embodiments computer storage may also be computer memory or vice versa.

A 'processor' as used herein encompasses an electronic component which is able to execute a program or machine executable instruction or computer executable code. References to the computing device comprising "a processor" should be interpreted as possibly containing more than one processor or processing core. The processor may for instance be a multi-core processor. A processor may also refer to a collection of processors within a single computer system or distributed amongst multiple computer systems. The term computing device should also be interpreted to possibly refer to a collection or network of computing devices each comprising a processor or processors. The computer executable code may be executed by multiple processors that may be within the same computing device or which may even be distributed across multiple computing devices.

Computer executable code may comprise machine executable instructions or a program which causes a processor to perform an aspect of the present invention. Computer executable code for carrying out operations for aspects of the present invention may be written in any combination of one or more programming languages, including an object-oriented programming language such as Java, Smalltalk, C++ or the like and conventional procedural programming languages, such as the "C" programming language or similar programming languages and compiled into machine executable instructions. In some instances, the computer executable code may be in the form of a high-level language or in a pre-compiled form and be used in conjunction with an interpreter which generates the machine executable instructions on the fly.

The computer executable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It is understood that each block or a portion of the blocks of the flowchart, illustrations, and/or block diagrams, can be implemented by computer program instructions in form of computer executable code when applicable. It is further under stood that, when not mutually exclusive, combinations of blocks in different flowcharts, illustrations, and/or block diagrams may be combined. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

A 'user interface' as used herein is an interface which allows a user or operator to interact with a computer or computer system. A 'user interface' may also be referred to as a 'human interface device.' A user interface may provide information or data to the operator and/or receive information or data from the operator. A user interface may enable input from an operator to be received by the computer and may provide output to the user from the computer. In other words, the user interface may allow an operator to control or manipulate a computer and the interface may allow the computer indicate the effects of the operator's control or manipulation. The display of data or information on a display or a graphical user interface is an example of providing information to an operator. The receiving of data through a keyboard, mouse, trackball, touchpad, pointing stick, graphics tablet, joystick, gamepad, webcam, headset, pedals, wired glove, remote control, and accelerometer are all examples of user interface components which enable the receiving of information or data from an operator.

A 'hardware interface' as used herein encompasses an interface which enables the processor of a computer system to interact with and/or control an external computing device and/or apparatus. A hardware interface may allow a processor to send control signals or instructions to an external computing device and/or apparatus. A hardware interface may also enable a processor to exchange data with an external computing device and/or apparatus. Examples of a hardware interface include, but are not limited to: a universal serial bus, IEEE 1394 port, parallel port, IEEE 1284 port, serial port, RS-232 port, IEEE-488 port, Bluetooth connection, Wireless local area network connection, TCP/IP connection, Ethernet connection, control voltage interface, MIDI interface, analog input interface, and digital input interface.

A 'display' or 'display device' as used herein encompasses an output device or a user interface adapted for displaying images or data. A display may output visual, audio, and or tactile data. Examples of a display include, but are not limited to: a computer monitor, a television screen, a touch screen, tactile electronic display, Braille screen, Cathode ray tube (CRT), Storage tube, Bi-stable display, Electronic paper, Vector display, Flat panel display, Vacuum fluorescent display (VF), Light-emitting diode (LED) displays, Electroluminescent display (ELD), Plasma display panels (PDP), Liquid crystal display (LCD), Organic light-emitting diode displays (OLED), a projector, and Head-mounted display.

A medical image is defined herein as being the reconstructed two- or three-dimensional data which can be used to render an image of anatomic data. The medical image is acquired using a medical imaging modality. The visualization can be performed using a computer.

Magnetic Resonance (MR) data is defined herein as being the recorded measurements of radio frequency signals emitted by atomic spins using the antenna of a Magnetic resonance apparatus during a magnetic resonance imaging scan. Magnetic resonance data is an example of medical image data. A Magnetic Resonance Imaging (MRI) image or MR image is defined herein as being the reconstructed two- or three-dimensional visualization of anatomic data contained within the magnetic resonance imaging data. A magnetic resonance image is an example of a medical image.

BRIEF DESCRIPTION OF THE DRAWINGS

In the following preferred embodiments of the invention will be described, by way of example only, and with reference to the drawings in which.

DETAILED DESCRIPTION OF THE EMBODIMENTS

Like numbered elements in these figures are either equivalent elements or perform the same function. Elements which have been discussed previously will not necessarily be discussed in later figures if the function is equivalent.

Figure 1:
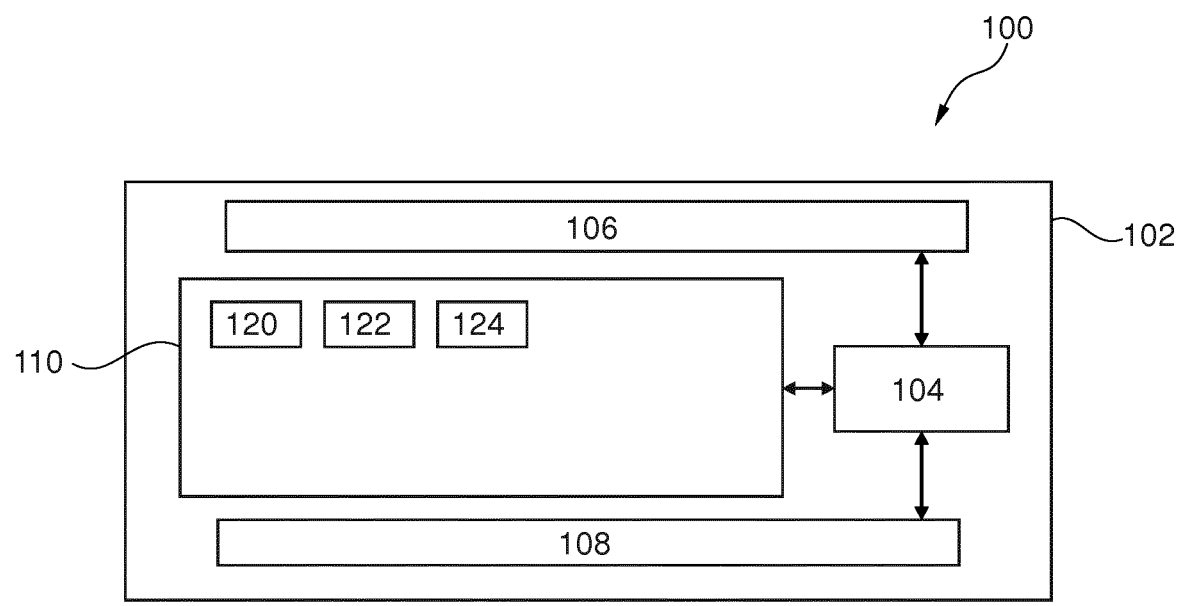
FIG. 1 illustrates an example of a medical instrument.

FIG. 1 illustrates an example of a medical apparatus 100. The medical apparatus 100 is shown as comprising a computer 102. The computer comprises a processor 104 that is in communication with an optional hardware interface 106, a user interface 108, and a memory 110. The hardware interface 106 may for example be used by the processor 104 to communicate or control other computer systems and/or to control other components of the medical apparatus 100. The memory 110 may be any combination of memory which is accessible to the processor 104. This may include such things as main memory, cached memory, and also non-volatile memory such as flash RAM, hard drives, or other storage devices. In some examples the memory 110 may be considered to be a non-transitory computer-readable medium.

The memory 110 is shown as comprising machine-executable instructions 120. The machine-executable instructions 120 enable the processor 104 to control other components of the medical imaging system 100 and/or to perform basic data manipulation techniques and calculations. For example, the machine-executable instructions 120 may include instructions which enable the processor 104 to perform a model-based segmentation. The memory 110 is further shown as containing medical image 122 that has been received. The medical image 122 may for example be received via a network connection via the hardware interface 106. In other examples the medical apparatus 100 may contain components for acquiring the medical image 122. The memory 110 is further shown as containing an image segmentation 124 that was provided by segmenting the medical image 122 into multiple tissue regions using a model-based segmentation. The model-based segmentation may for example be implemented in the machine-executable instructions 120.

Figure 2:
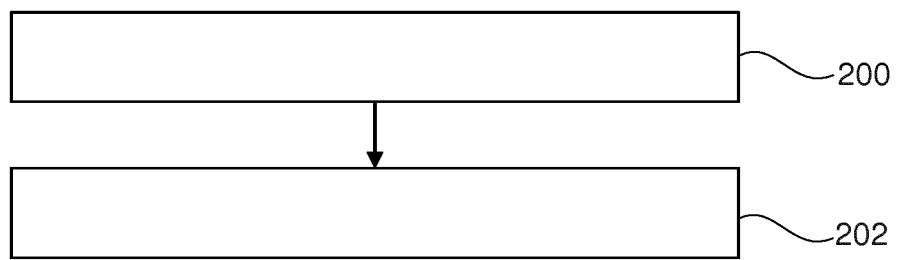
FIG. 2 shows a flow chart which illustrates a method of operating the medical instrument of FIG. 1.

FIG. 2 shows a flowchart which illustrates a method of operating the medical imaging system 100 of FIG. 1. The method starts with step 200. First in step 200 the medical image 122 is received. The medical image is descriptive of the three-dimensional anatomy of a subject. For example the medical image may be data which is descriptive of measurements taken by a magnetic resonance imaging system, a positron emission tomography system, or a CT imaging system. Next in step 202 the image segmentation 124 is provided by segmenting the medical image 122 into multiple tissue regions using a model-based segmentation. The model-based segmentation assigns a tissue type to each of the multiple regions. The model-based segmentation has a surface mesh. The segmentation is corrected by using the tissue type assigned to each of the multiple regions to correct for partial volume effects at boundaries formed by the surface mesh between at least some of the multiple tissue regions.

Figure 3:
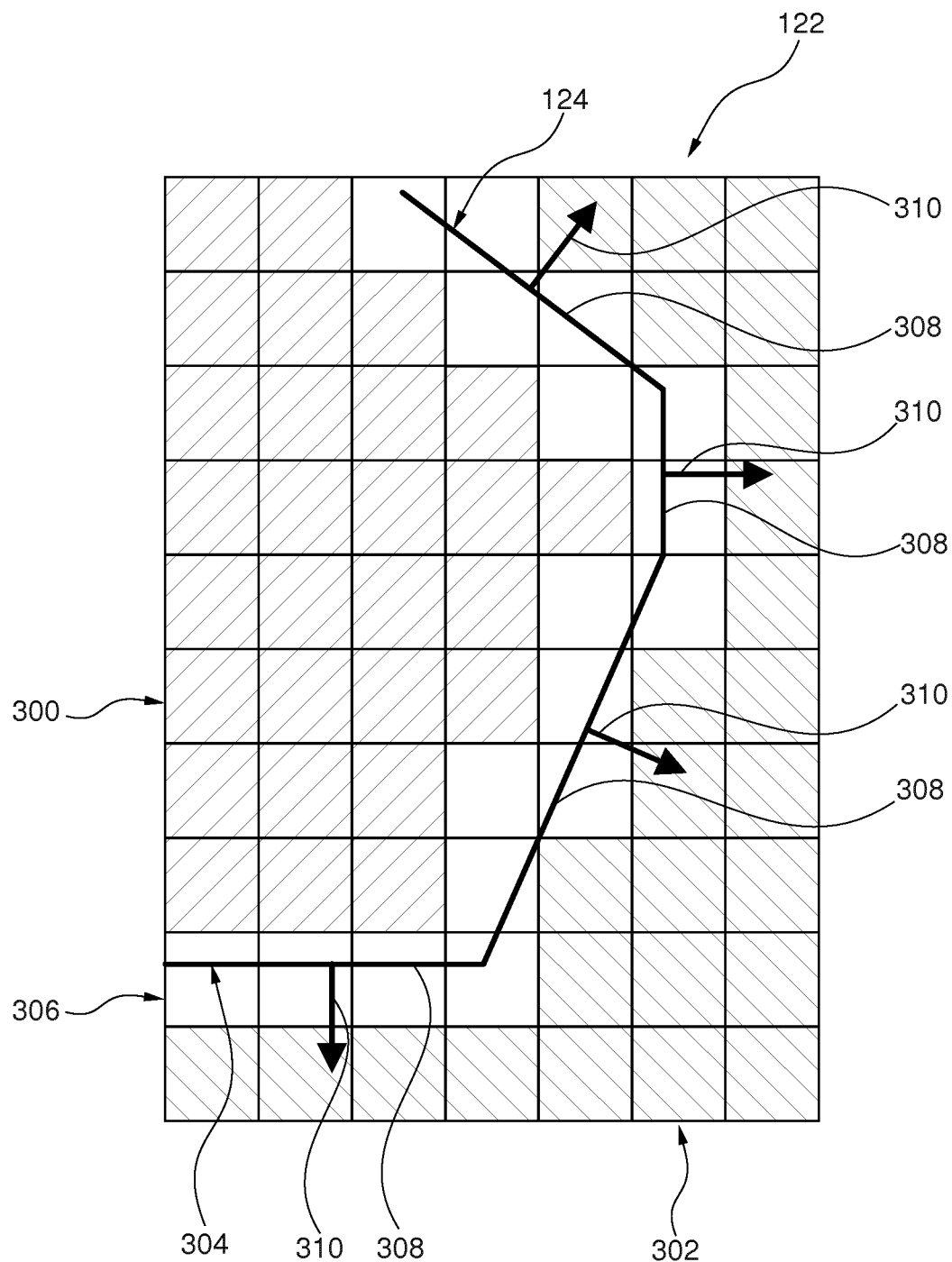
FIG. 3 illustrates a further example of a medical instrument.

FIG. 3 illustrates an example of a medical image 122. The medical image in FIG. 3 is idealized. The medical image in FIG. 3 is divided into voxels of three types. There are voxels of a first tissue type 300 which have hash marks in a first direction. There are voxels of a second tissue type 302 which have hash marks in an opposing direction. There are also voxels which represent boundary voxels 306 between the voxels 300 of the first tissue type and voxels 302 of the second tissue type. The boundary voxels 306 are not shaded or hashed. The medical image 122 is an idealization. The medical image 122 in FIG. 3 is only a two-dimensional plot. The model-based segmentation may for example be useful on three-dimensional datasets. The dark line labeled 124 represents the image segmentation. The image segmentation 124 is formed from a surface mesh 304.

Again, as this is only a two-dimensional image the surface mesh 304 is represented by a collection of lines. The surface mesh 304 is formed by a number of faces 308. In a three-dimensional representation these would likely be triangular or polygonal faces or surfaces. Each face 308 has a normal vector 310. The normal vector 310 is perpendicular to each of the faces 308. The voxels 300 of a first tissue type may be assumed to have an image intensity within a first range of values. The voxels 302 of the second tissue type may be assumed to have a voxel intensity or value between a second range of values. The boundary voxels 306 however may contain a mixture of both the first tissue type 300 and the second tissue type 302. The intensity of these voxels would then therefore be somewhere between the first intensity range and the second intensity range.

The position of the faces 308 can be adjusted by moving them forwards or backwards and still perpendicular to the normal vectors 310. By sliding the position of the faces 308 the proper proportion of the first tissue type 300 and the second tissue type 302 in each voxel can be achieved so that the position of the faces 308 is consistent with the actual intensity of the boundary voxels 306. In practice this may not be possible for every voxel. In this case a set of equations may be set up to solve for the position of the faces 308 which best provides for the proper intensities of the boundary voxels 306. The example illustrated in FIG. 3 was for a normal vector for planar faces. However, the example provided in FIG. 3 is also analogous to the case where the faces are curved and outward facing vectors are chosen as the direction to move the curved faces.

Figure 4:
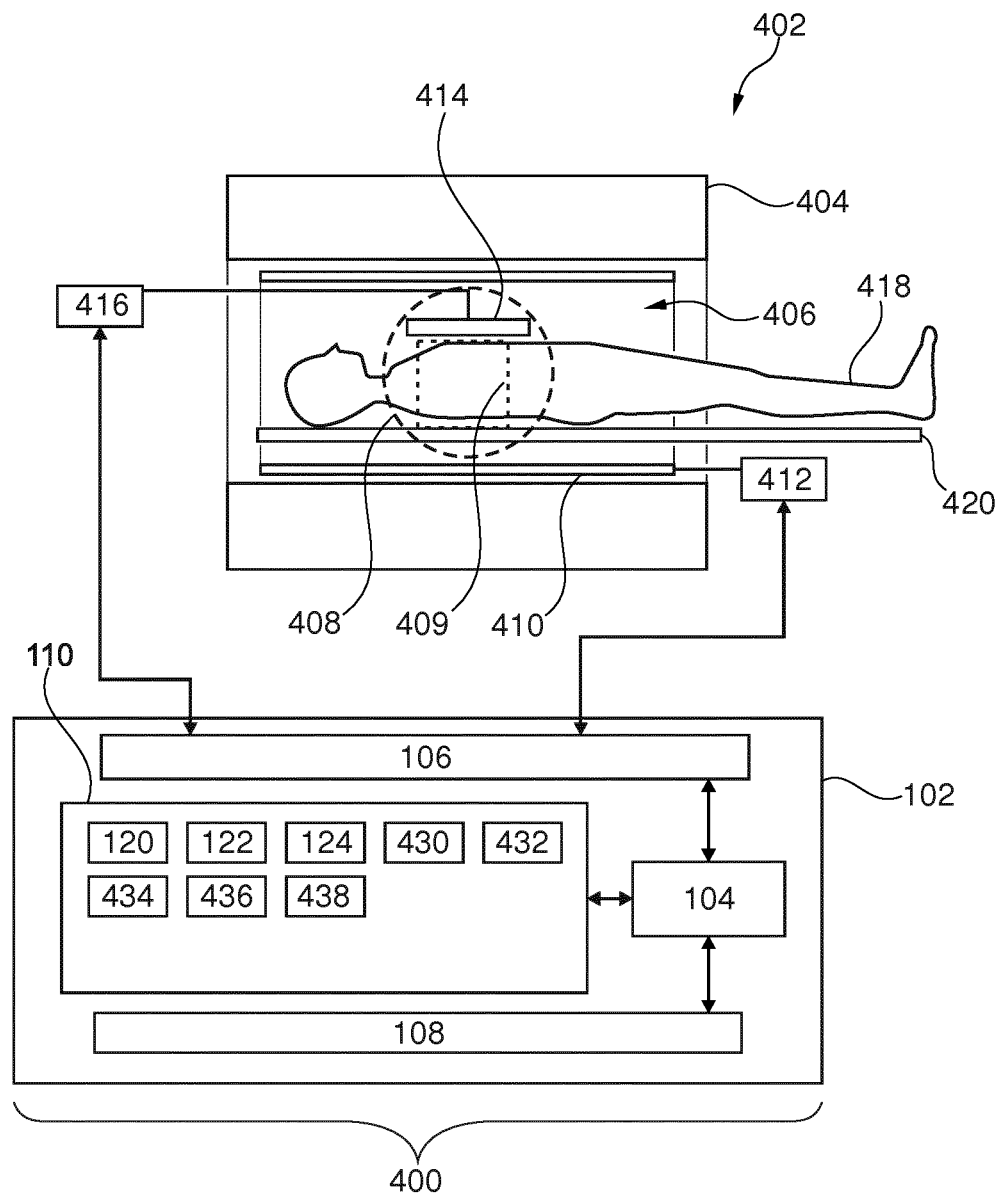
FIG. 4 shows a flow chart which illustrates a method of operating the medical instrument of FIG. 3.

FIG. 4 illustrates a further example of a medical instrument 400. The medical instrument 400 comprises the computer system 102 of FIG. 1 and also a magnetic resonance imaging system 402. The magnetic resonance imaging system 402 comprises a magnet 404. The magnet 404 is a superconducting cylindrical type magnet with a bore 406 through it. The use of different types of magnets is also possible; for instance it is also possible to use both a split cylindrical magnet and a so called open magnet. A split cylindrical magnet is similar to a standard cylindrical magnet, except that the cryostat has been split into two sections to allow access to the iso-plane of the magnet, such magnets may for instance be used in conjunction with charged particle beam therapy. An open magnet has two magnet sections, one above the other with a space in-between that is large enough to receive a subject: the arrangement of the two sections area similar to that of a Helmholtz coil. Open magnets are popular, because the subject is less confined. Inside the cryostat of the cylindrical magnet there is a collection of superconducting coils.

Within the bore 406 of the cylindrical magnet 404 there is an imaging zone 108 where the magnetic field is strong and uniform enough to perform magnetic resonance imaging. A region of interest 409 is shown within the imaging zone 408. The magnetic resonance data that is acquired typically acquired for the region of interest. A subject 418 is shown as being supported by a subject support 420 such that at least a portion of the subject 418 is within the imaging zone 408 and the region of interest 409.

Within the bore 406 of the magnet there is also a set of magnetic field gradient coils 410 which is used for acquisition of preliminary magnetic resonance data to spatially encode magnetic spins within the imaging zone 408 of the magnet 404. The magnetic field gradient coils 410 connected to a magnetic field gradient coil power supply 412. The magnetic field gradient coils 410 are intended to be representative. Typically magnetic field gradient coils 410 contain three separate sets of coils for spatially encoding in three orthogonal spatial directions. A magnetic field gradient power supply supplies current to the magnetic field gradient coils. The current supplied to the magnetic field gradient coils 410 is controlled as a function of time and may be ramped or pulsed.

Adjacent to the imaging zone 408 is a radio-frequency coil 414 for manipulating the orientations of magnetic spins within the imaging zone 408 and for receiving radio transmissions from spins also within the imaging zone 408. The radio frequency antenna may contain multiple coil elements. The radio frequency antenna may also be referred to as a channel or antenna. The radio-frequency coil 414 is connected to a radio frequency transceiver 416. The radio-frequency coil 414 and radio frequency transceiver 416 may be replaced by separate transmit and receive coils and a separate transmitter and receiver. It is understood that the radio-frequency coil 414 and the radio frequency transceiver 416 are representative. The radio-frequency coil 414 is intended to also represent a dedicated transmit antenna and a dedicated receive antenna. Likewise the transceiver 416 may also represent a separate transmitter and receivers. The radio-frequency coil 414 may also have multiple receive/transmit elements and the radio frequency transceiver 416 may have multiple receive/transmit channels. For example if a parallel imaging technique such as SENSE is performed, the radio-frequency could 414 have multiple coil elements.

The transceiver 416 and the gradient controller 412 are shown as being connected to a hardware interface 106 of the computer system 102. The memory 134 is shown as containing machine-executable instructions 120. The machine-executable instructions 120 enable the processor 104 to control the operation and function of the magnetic resonance imaging system 402.

The memory 110 is further shown as containing pulse sequence commands 430. The pulse sequence commands 430 are configured for controlling the magnetic resonance imaging system 402 to acquire magnetic resonance imaging data according to a magnetic resonance imaging protocol. The memory 110 is further shown as containing magnetic resonance imaging data 432 that has been acquired by controlling the magnetic resonance imaging system 402 with the pulse sequence commands 430. The machine-executable instructions 120 may for example have caused the processor 104 to reconstruct the medical image 122 from the magnetic resonance imaging data 432. FIG. 4 is intended to be representative. In FIG. 4 a magnetic resonance imaging system 402 is shown. However, the magnetic resonance imaging system 402 may be substituted with a CT system or a PET system.

The memory 110 is shown as optionally containing a pseudo radiographic image 434. The pseudo radiographic image 434 was constructed using the image segmentation 124 and the identification of different tissue types within the medical image 122. The memory 110 is further shown as containing an combined image 436 that is a combination of the pseudo radiographic image 434 and the medical image 122. In this example it would likely be a combination of a pseudo CT image and the magnetic resonance image 122. The memory 110 is further shown as containing optional radiation therapy planning data 438. For example, the combined image 436 could be displayed using the user interface 108 and data which identifies regions to be irradiated and also areas which may be desired not to be irradiated may comprise the radiation therapy planning data 438. The calculation of the pseudo radiographic image, the combined image and also the receiving of the radiation therapy planning data may be performed using a separate and distinct workstation also.

Figure 5:
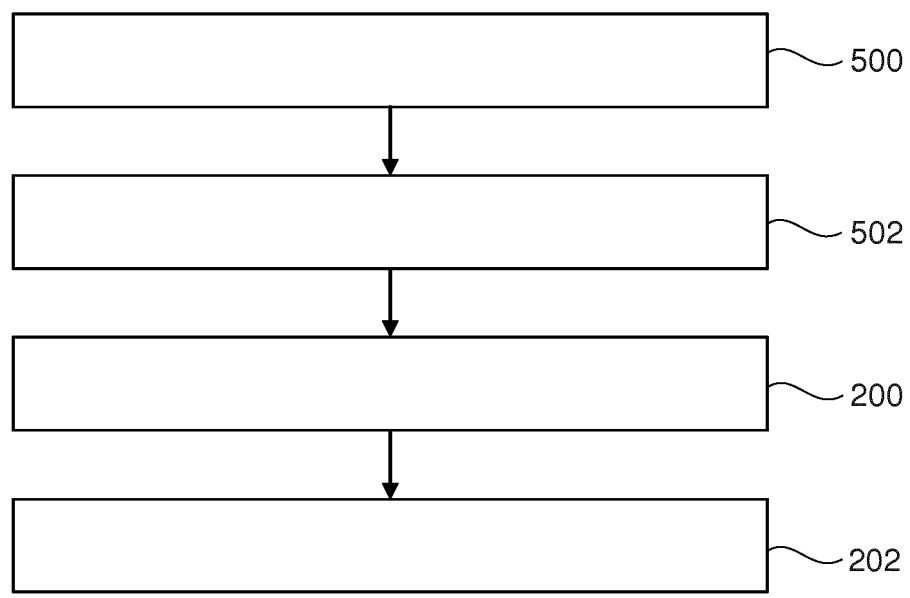
FIG. 5 illustrates a further example of a medical instrument

FIG. 5 shows a flowchart which illustrates a method of operating the medical instrument 400 of FIG. 4. First in step 500 the magnetic resonance imaging system 402 is controlled with the pulse sequence commands 430 to acquire the magnetic resonance imaging data 432. Next in step 502 the magnetic resonance image 122 is reconstructed using the magnetic resonance imaging data 432. The method then proceeds to step 200 and 202 as were previously illustrated in FIG. 2.

Figure 6:
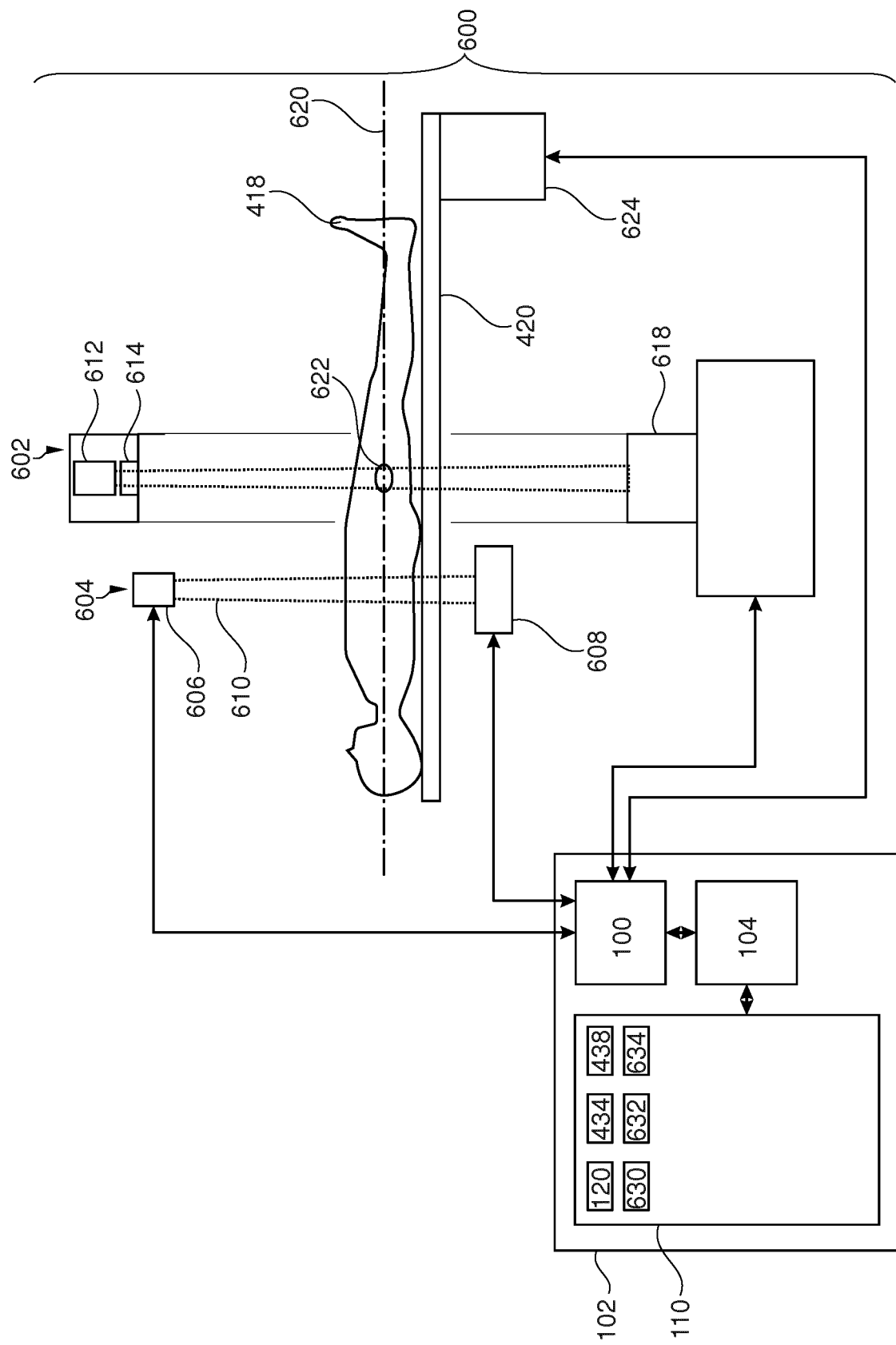
FIG. 6 show an example of a magnetic resonance image.

FIG. 6 illustrates a further example of the medical apparatus 600. The features illustrated in FIG. 6 could be freely combined with the features illustrated in FIGS. 1 and 4. The medical apparatus 600 is shown as comprising a computer 102, a radiotherapy system 602, and a radiographic imaging system 604. The computer system 102 could for example be one or more computing systems that are networked. For example, the features illustrated in FIG. 6 could be networked with the features illustrated in FIGS. 1 and 4 to form a complete medical apparatus 600.

The radiographic imaging system 604 is intended to illustrate a radiographic imaging system such as an X-ray system, a fluoroscope, or a CT system. The features of the radiotherapy system 602 and the radiographic imaging system 604 are shown as being separate and distinct. However, the features of the radiographic imaging system 604 may be integrated into the features of the radiotherapy system 602. The radiographic imaging system 604 is shown as having an X-ray source 606 and an X-ray detector 608. In the case where the source 606 and the detector 608 are static the radiographic imaging system 604 is a digital X-ray or fluoroscope system. In some instances, the radiographic imaging system 604 may be a complete CT system.

The radiotherapy system 602 is intended to be illustrative and may for example be an X-ray therapy system, a gamma ray system therapy, or a LINAC. The radiotherapy system 602 is shown as comprising a radiotherapy source 612 that produces ionizing radiation 616. The X-ray source 606 produces an X-ray beam 610. In the case where the radiotherapy source 612 is an X-ray therapy system the X-ray source 606 could be the radiotherapy source 612.

The radiotherapy system 602 further comprises a gantry 618 that is configured for rotating the radiotherapy source 612 along with a collimator 614 about an axis of rotation 620. The focus of the axis 620 is a target zone 622. The medical apparatus 600 is further shown as containing an optional subject support positioning system 624 which is configured for moving the subject support 420 and the subject 418 to change the relation of the subject 418 to the target zone 622.

The memory 110 is shown as containing machine-executable instructions which enable the processor 106 to control the operation and function of the radiotherapy system 602 and the radiographic imaging system 604 as well as any other additional components of the medical apparatus 600. The memory 110 is further shown as containing a pseudo radiographic image 434. The memory 110 is further shown as containing the radiation therapy planning data 438. The memory 110 is further shown as containing an electron density map 630 that was reconstructed from the pseudo radiographic image 434. The execution of the machine-executable instructions then enables the processor 104 to construct radiotherapy control commands 632. The radiotherapy control commands 632 are configured for controlling the radiotherapy system 602 to irradiate the target zone 622.

The memory 110 is further shown as containing an acquired radiographic image 634 that was acquired using the radiographic imaging system 604. The acquired radiographic image 634 may be registered to the pseudo radiographic image 434 so that the subject 418 can be properly positioned. The radiographic imaging system 604 is shown as being offset from the radiotherapy system 602. This is merely to illustrate the separate components. In some examples they may be aligned with one another so that the radiographic imaging system 604 can image the region which is intended to be targeted of the subject 418. In other examples the subject 418 may be moved past the radiographic imaging system 604 to obtain the position of the subject 418 relative to the coordinates system of the radiotherapy system 602 and then moved into position.

Figure 7:
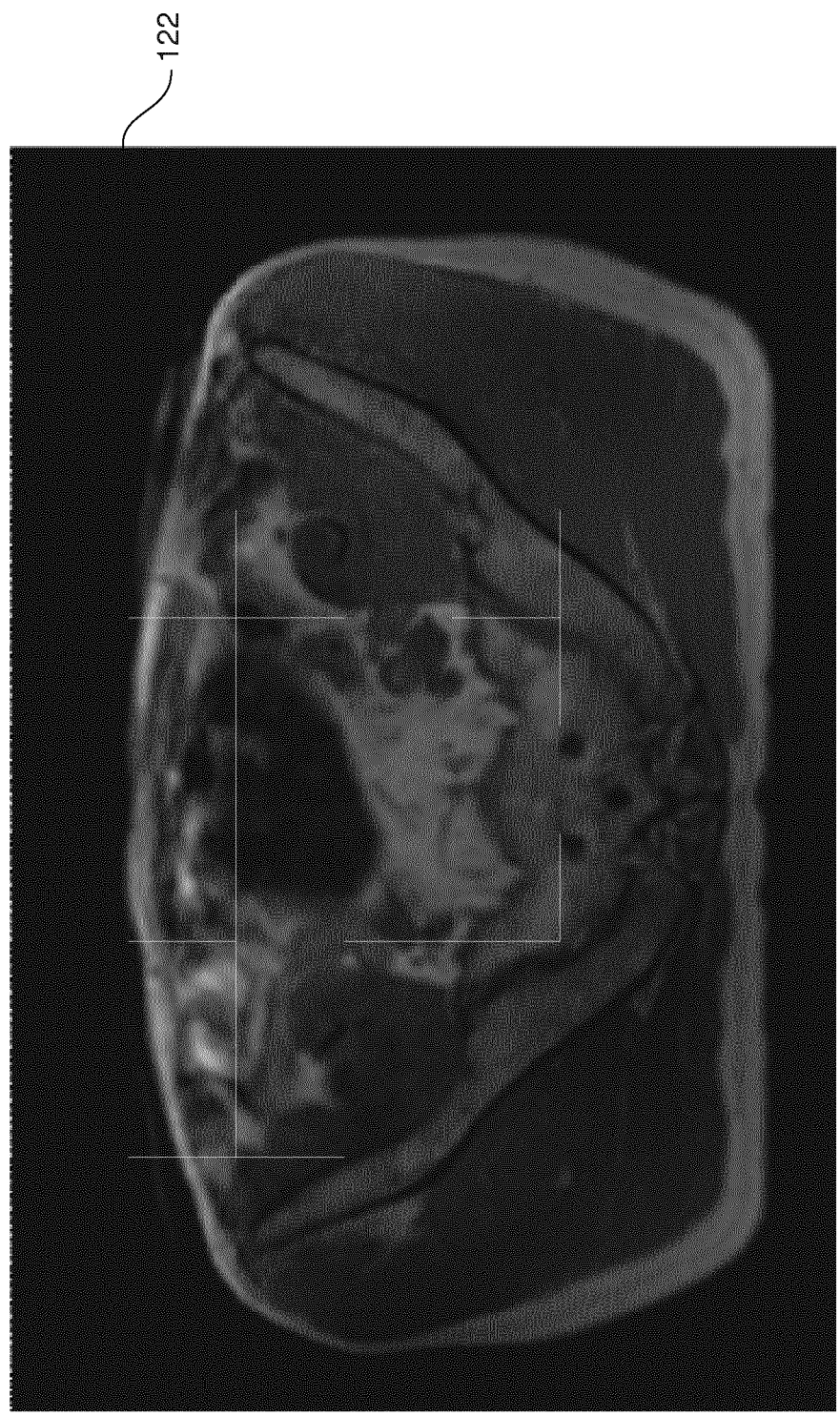
FIG. 7 shows the magnetic resonance image of FIG. 6 with a model-based segmentation overlaid.
Figure 8:
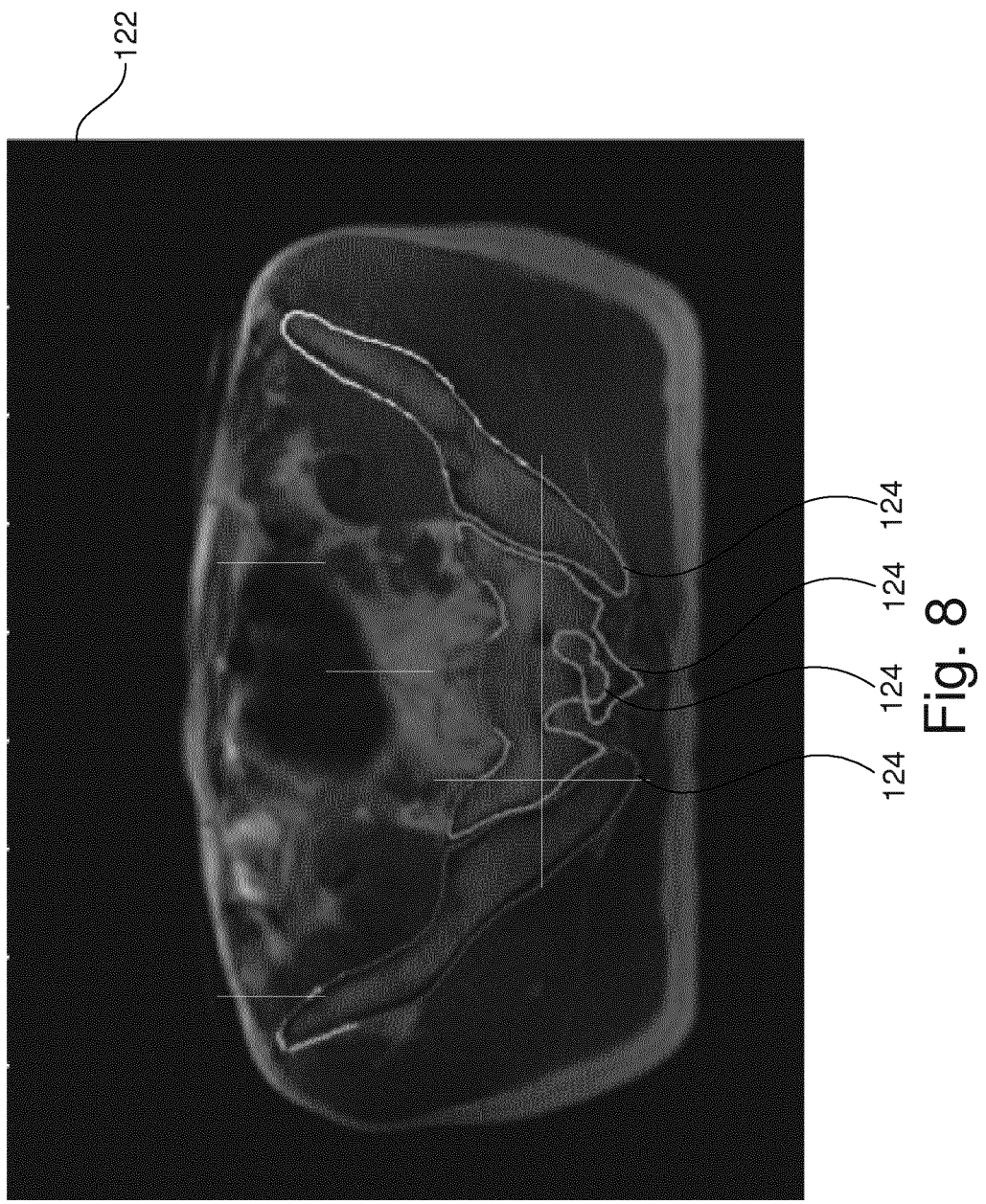
FIG. 8 shows an acquired CT image.

FIG. 7 illustrates an example of a magnetic resonance image 122. FIG. 8 shows the same magnetic resonance image 122 with the model-based segmentation 124 overlaid over the image. The segmentation 124 shown in FIG. 8 only shows a segmentation for bone surfaces. The segmentation of other soft tissues in FIG. 8 is not shown.

Figure 9:
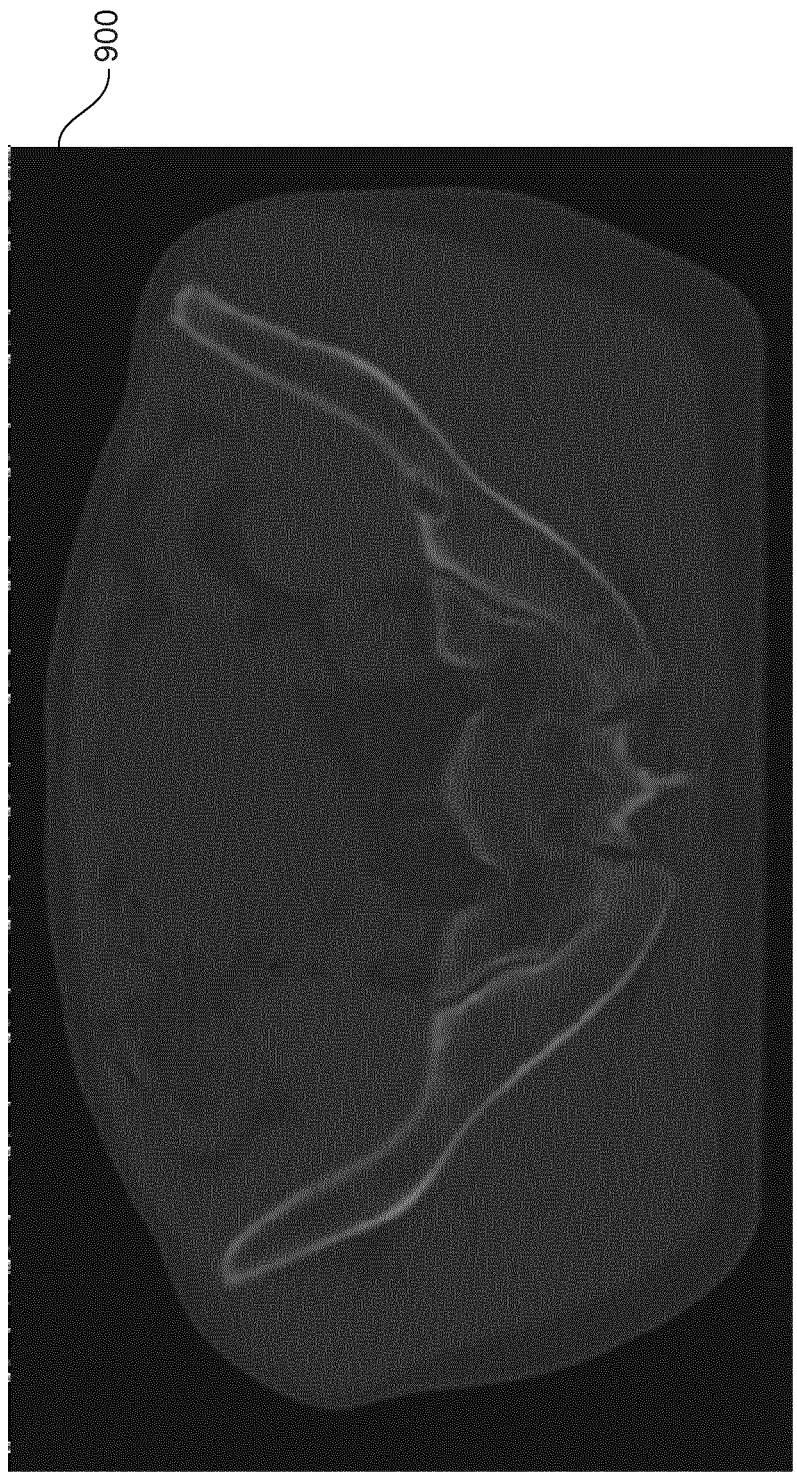
FIG. 9 shows an example of a pseudo CT image constructed from the segmentation of FIG. 7.

FIG. 9 shows an example of a measured CT image 900. In this CT image 900 it can be seen that the bone structures are shown as being particularly dense at their borders due to cortical bone.

Figure 10:
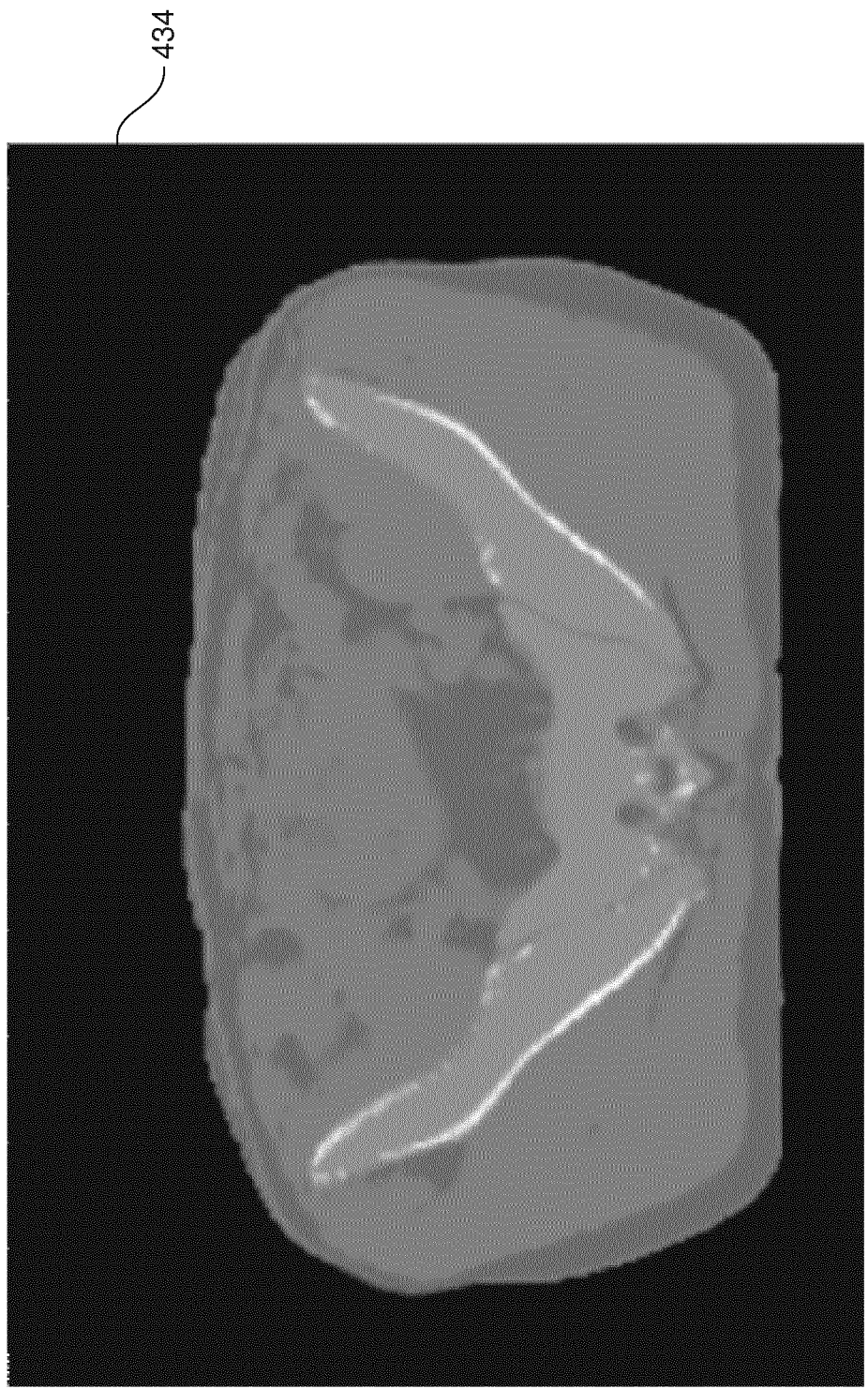

FIG. 10 then shows an example of a pseudo radiographic image 434 constructed using the segmentation of FIG. 8. In this example the pseudo radiographic image is a pseudo CT image. The outline of the bone structures in FIG. 9 is not pronounced in several locations as the real CT image displayed in FIG. 9. In FIG. 10, there is a clearly visible missing outer cortical bone layer. This is because a model of the cortical bone was not used in the product of this pseudo CT image 900.

Whenever accurate segmentation of structures on medical images is required, partial volume correction may be a confounding factor. General solutions for a partial volume correction are not available. However, when an anatomical segmentation 124 (e.g. from a model-based segmentation using a triangulated surface mesh) including the intensity distribution at the inside and/or outside of the structure boundary is available, this knowledge can be exploited. Examples may use the segmentation boundary 304 (surface mesh) for (1) partial volume correction and (2) using the correction to refine the segmentation. The triangles 308 (faces) of a mesh cutting one specific voxel are shifted along the normal so that, assuming certain fixed inside an outside intensity values, the resulting volume fractions in the voxel give the measured intensity.

The partial volume effect is ubiquitous in medical imaging, and various strategies have been devised in order to correct for it. Since the strength of the partial volume effect depends on the resolution, one possible strategy is to use information from a high-resolution image 122 (medical image such as CT or MRI) to correct for the partial volume effect in a modality with inherently lower resolution (e.g. PET).

Problems or disadvantages overcome by the invention: In the context of pseudo radiographic images 434, i.e. the generation of CT-like images 434 (pseudo-CT or pseudo radiographic images) from MR images 122 (or other types of medical images) for the purpose of dose simulation in radiation therapy, the partial volume effect is particularly problematic since it often leads to a loss of the outermost layer of high-density (cortical) bone. The current MR-radiotherapy (MR-RT) algorithm for pseudo CT image generation first segments the bone on the respective MR images using a triangulated mesh model of the bone surface. In a subsequent step pseudo-CT values are assigned to the voxels within the bone compartment based on their intensity (low-intensity voxels are mapped to high pseudo-CT values and vice versa). Due to the resolution of the MR image, which is lower than the usual CT resolution, and the partial volume effect, many of the voxels depicting cortical bone on the MR images (the dark rim near the colored lines in FIG. 8) are not assigned to the "cortical bone" class correctly.

Examples may provide for a model-based segmentation result being accurate within the range of one voxel, it is safe to assume that a layer of cortical bone is inside of the segmentation and either fat or muscle is outside of the segmentation. For MR images, essentially no signal comes from cortical bone, so the intensity from the cortical bone layer is the noise mean which can be calibrated beforehand. The tissue class (fat or muscle) and the respective intensities of the tissue on the outside of the segmentation can be inferred from the local neighborhood. Using these intensity values, the surface of the segmentation cutting a specific voxel is shifted so that the intensity resulting from the respective portions of bone and soft tissue in the voxel equals the measured intensity. Now knowing this position and the respective portions of bone and soft tissue and assuming population-average pseudo-CT values for cortical bone, muscle and fatty tissue, the partial volume effect can be "forward simulated" for the pseudo CT image generation. This avoids the discrete decisions on the tissue class (i.e. does a voxel belong to the bone or to the soft tissue compartment, and is it then a cortical bone or bone marrow/fat or muscle tissue voxel) but yields smoother transitions.

At the same time the model-based segmentation uses an energy minimization scheme to balance shape conserving forces against forces that attract the mesh to the image. Those image forces rely on "target points" that are detected along the normal of the mesh triangles. If the mesh is sufficiently close to the actual solution (roughly within one voxel), then the outlined method of partial volume correction would yield a more precise estimate of the true "target point", which could be integrated into the framework and could result in a more accurate segmentation.

As an example, an MR image with a (non-corrected) bone mesh 304 (surface mesh) representing the bone segmentation 124 is assumed. Then for each voxel cut by the bone mesh the following procedure is performed: Let the measured intensity of the voxel be $I_{measured}$, and let the bone intensity (mean noise) be $I_{bone}$ and the outside intensity (estimated from the local neighborhood on the outside) be $I_{outside}$. Then the fraction of the voxel belonging to the bone is given by $$\alpha = (I_{measured} - I_{outside})/(I_{bone} - I_{outside}).$$

Now the triangles cutting the voxels can be shifted along their normals 310 until the geometric fraction of the voxel belonging to the inside of the mesh equals $\alpha$, yielding a surface position estimate with subvoxel accuracy. This position can be used within the "force balancing" framework of model-based segmentation in order to avoid very noisy surfaces. Now for the pseudo CT value assignment, assuming $I_{bone,CT}$ as the population-average CT value for cortical bone and $I_{outside,CT}$ as the respective CT value for the outside tissue (based on the MR classification to either muscle or fatty tissue, the respective CT values should be used), the boundary voxel is assigned the value $$I_{PSEUDOCT} = \alpha I\_bone + (1-\alpha) I_{outside}.$$

Examples may yield a smooth transition between bone and soft tissue, at the same time reflecting the anatomical fact the outermost layer of a bone always consists of cortical bone and thus giving more anatomically correct looking pseudo CT images. Note that the method was described for the example of bone surfaces on MR images, but is generally applicable to all situations where a segmentation is available with known inside and outside intensity values. For example, this can be applied to the various tissue types within a brain.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

LIST OF REFERENCE NUMERALS 100 medical apparatus
102 computer
104 processor
106 hardware interface
108 user interface
110 memory
120 machine executable instructions
122 medical image
124 image segmentation
200 receive medical image descriptive of a three-dimensional anatomy of a subject
202 provide an image segmentation by segmenting the medical image into multiple tissue regions using a model-based segmentation
300 voxels of first tissue type
302 voxels of second tissue type
304 surface mesh
306 boundary voxels
308 face
310 normal vector
400 medical instrument
402 magnetic resonance imaging system
404 magnet
406 bore of magnet
408 imaging zone
409 region of interest
410 magnetic field gradient coils
412 magnetic field gradient coil power supply
414 radio-frequency coil
416 transceiver
418 subject
420 subject support
430 pulse sequence commands
432 magnetic resonance imaging data
434 pseudo radiographic image
436 combined image
438 radiation therapy planning data
500 control the magnetic resonance imaging system with the pulse sequence commands to acquire the magnetic resonance imaging data
502 reconstruct the magnetic resonance image using the magnetic resonance imaging data
600 medical apparatus
602 radiotherapy system
604 radiographic imaging system
606 x-ray source
608 x-ray detector
610 x-ray beam
612 radio therapy source
614 collimator
616 ionizing radiation
618 gantry
620 axis of rotation
622 target zone
624 subject support positioning system
630 electron density map
632 radiotherapy control commands
634 acquired radiographic image
900 CT image

The invention claimed is:

1. A medical apparatus comprising:
a memory configured to store machine executable instructions;
a processor configured to control the medical apparatus, wherein execution of the machine executable instructions causes the processor to:
receive a medical image descriptive of a three-dimensional anatomy of a subject (418); and
provide an image segmentation by segmenting the medical image into multiple tissue regions using a model-based segmentation, wherein the model-based segmentation assigns a tissue type to each of the multiple regions, wherein the model-based segmentation has a surface mesh, wherein the model-based segmentation comprises a cortical bone model and wherein the segmentation is corrected by using the tissue type assigned to each of the multiple regions to correct for partial volume effects at boundaries formed by the surface mesh between at least some of the multiple tissue regions; and
reconstruct a pseudo radiographic image using the image segmentation and the tissue type assigned to each of the multiple regions, wherein execution of the machine executable instructions causes the processor to correct the pseudo radiographic image using the cortical bone model by forward simulating the partial volume effect correction of the image segmentation in the pseudo radiographic image.

2. The medical apparatus of claim 1, wherein the surface mesh is formed from faces, wherein each of the faces has an outward facing vector, wherein the correction of the segmentation is performed by adjusting the position of each of the faces in the direction of the outward facing vector to correct the partial volume effect at the boundaries between at least some of the multiple tissue regions.

3. The medical apparatus of claim 2, wherein the medical image comprises voxels, wherein the model-based segmentation assigns a voxel intensity range to each tissue type, wherein boundary voxels exhibiting the partial volume effect have a voxel intensity intermediate to the voxel intensity range on either side of the surface mesh, wherein the adjusting of the position of each of the faces in the direction of the outward facing vector is performed by adjusting the position of each of the faces such that the voxel intensity of the boundary voxels is consistent with the contribution to the voxel intensity from the tissue types on both sides of the surface mesh.

4. The medical apparatus of claim 2, wherein the correction of the segmentation is performed after segmentation by the model-based segmentation.

5. The medical apparatus of claim 2, wherein the model-based segmentation is a shape constrained deformable model that is configured for segmenting the medical image by balancing an external energy term which defines an attraction to boundaries in the magnetic resonance image with an internal energy term which defines the shape constraint of the shape constrained deformable model, and wherein the correction of the segmentation is incorporated into the external energy term.

6. The medical apparatus of claim 1, wherein the cortical bone model corrects the pseudo radiographic image by segmenting the cortical bone into layers.

7. The medical apparatus of claim 1, wherein the cortical bone model is configured for segmenting cortical bone into multiple cortical bone layers, wherein execution of the machine executable instructions further causes the processor to correct the pseudo radiographic image using the multiple cortical bone layers.

8. The medical apparatus of claim 1, wherein execution of the machine executable instructions further causes the processor to reconstruct an electron density map using the pseudo radiographic image.

9. The medical apparatus of claim 8, wherein execution of the machine executable instructions further causes the processor to:
receive radiation therapy planning data; and
calculate radiotherapy system control commands configured for controlling a radiotherapy system using the electron density map and the radiation therapy planning data.

10. The medical apparatus of claim 8, wherein the pseudo radiographic image has a predefined resolution, wherein the medical apparatus further comprises the radiotherapy system, wherein the medical apparatus further comprises a radiographic imaging system, wherein execution of the machine executable instructions further causes the processor to:
forward simulate partial volume effects in the pseudo radiographic image;
control the radiographic imaging system to acquire an acquired radiographic image of a subject, wherein the acquired radiographic image has the predefined resolution; and
align the subject in the radiotherapy system by registering the acquired radiographic image and the pseudo radiographic image.

11. The medical apparatus of claim 1, wherein the medical image is a magnetic resonance image, wherein the medical apparatus comprises a magnetic resonance imaging system, wherein the memory further contains pulse sequence commands configured for controlling the magnetic resonance imaging system to acquire the magnetic resonance imaging data, and wherein execution of the machine executable instructions further causes the processor to:
control the magnetic resonance imaging system with the pulse sequence commands to acquire the magnetic resonance imaging data,
reconstruct the magnetic resonance image using the magnetic resonance imaging data.

12. A medical imaging method, wherein the method comprises:
receiving a medical image;
providing an image segmentation by segmenting the medical image into multiple tissue regions using a model-based segmentation, wherein the model-based segmentation assigns a tissue type to each of the multiple regions, wherein the model-based segmentation has a surface mesh, wherein the model-based segmentation comprises a cortical bone model, and wherein the segmentation is corrected by using the tissue type assigned to each of the multiple regions to correct for partial volume effects at boundaries formed by the surface mesh between at least some of the multiple tissue regions; and
reconstruct a pseudo radiographic image using the image segmentation and the tissue type assigned to each of the multiple regions, wherein execution of the machine executable instructions causes the processor to correct the pseudo radiographic image using the cortical bone model by forward simulating the partial volume effect correction of the image segmentation in the pseudo radiographic image.

13. A computer program product comprising machine executable instructions stored on a non-transitory computer readable medium for execution by a processor controlling a medical imaging system, wherein execution of the machine executable instructions causes the processor to:
receive a medical image;
provide an image segmentation by segmenting the medical image into multiple tissue regions using a model-based segmentation, wherein the model-based segmentation assigns a tissue type to each of the multiple regions, wherein the model-based segmentation has a surface mesh, wherein the model-based segmentation comprises a cortical bone model, and wherein the segmentation is corrected by using the tissue type assigned to each of the multiple regions to correct for partial volume effects at boundaries formed by the surface mesh between at least some of the multiple tissue regions; and reconstruct a pseudo radiographic image using the image segmentation and the tissue type assigned to each of the multiple regions, wherein execution of the machine executable instructions causes the processor to correct the pseudo radiographic image using the cortical bone model by forward simulating the partial volume effect correction of the image segmentation in the pseudo radiographic image.

14. The computer program product of claim 13, wherein the medical image is a magnetic resonance image, wherein execution of the machine executable instructions further causes the processor to:
reconstruct a pseudo radiographic image using the image segmentation and the tissue type assigned to each of the multiple regions; and
construct a combined image by combining the pseudo radiographic image with the magnetic resonance image.

15. The computer program product of claim 14, wherein execution of the machine executable instructions further causes the processor to:
render the combined image on a display; and
receive radiation therapy planning data from a user interface.

* * * * *